Jan. 23, 1973     B. NORTON     3,712,980
REFLECTOR ARRANGEMENT FOR ATTENUATING SELECTED
COMPONENTS OF SPECTRAL RADIATION
Filed Jan. 25, 1971     3 Sheets-Sheet 1
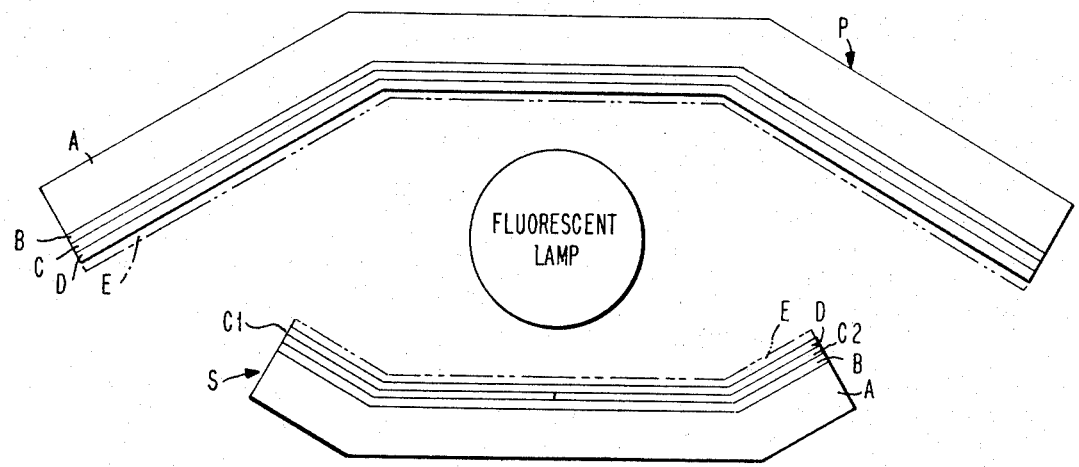
FIG. 1
FIG. 2
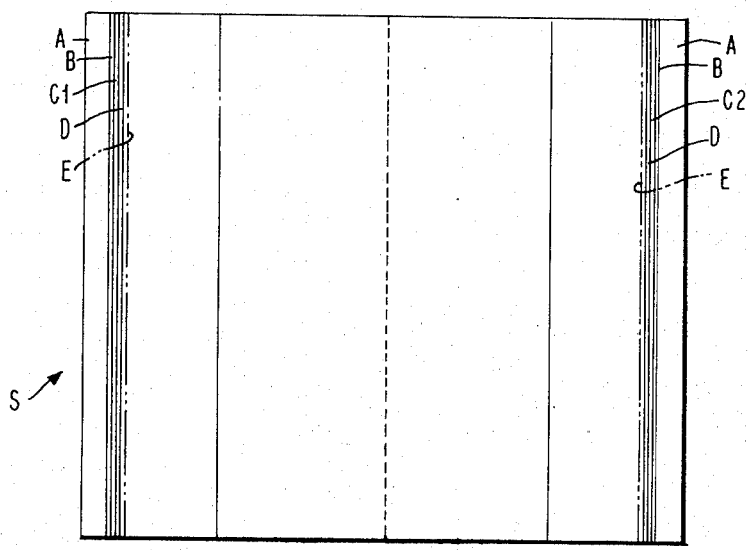
INVENTOR
BRUCE NORTON
BY Frederick E. Bartlett
ATTORNEY United States Patent Office 3,712,980
Patented Jan. 23, 1973

3,712,980
REFLECTOR ARRANGEMENT FOR ATTENUATING SELECTED COMPONENTS OF SPECTRAL RADIATION
Bruce Norton, Wappingers Falls, N.Y., assignor to Kollmorgen Corporation, Hartford, Conn.
Filed Jan. 25, 1971, Ser. No. 109,468
Int. Cl. F21v 29/00
U.S. Cl. 240—47
5 Claims

ABSTRACT OF THE DISCLOSURE

A reflector arrangement for gaseous discharge lamps is described, having reflecting surfaces representing resonant optical cavities at selected wavelengths for attenuating excessive peaks of spectral components characteristic of the primary radiation source.

---

This invention relates to reflectors for radiant energy and, more particularly, to a reflector arrangement for the attenuation of certain spectral components exceeding the normal energy level of radiation.

In the art of illumination, particularly in the use of fluorescent lamps, it is a well-known fact that the secondary radiation due to the phosphor coating may contain spectral energy attributable to the primary source, namely, the mercury arc. The spectral distribution of the latter generally includes a plurality of narrow bands of emission lines of radiation exceeding in amplitude that of the phosphor continuum. These are commonly referred to as peaks or spikes and have varying amplitudes. For general illumination, such spikes in the radiation spectrum are not considered significant. Consequently, reflectors and diffusers used for such light sources are neutral, in that they reflect all visible or near visible energy in equal amounts.

However, in various fields, the need to approximate a particular spectral power distribution, for example, that of daylight, for viewing purposes is a real one. Such fields would include color matching of pigments, paints, dyes, photographic processing, and the like.

In most cases, the viewing illumination is produced by one or more fluorescent lamps in some sort of a reflecting-diffusing fixture. However, within the spectral window of 300 to 700 nanometers there exist many intense emission lines characteristic of the phosphor excitation medium. Present day reflecting-diffusing fixtures do nothing to control or remove the unwanted presence of these emission lines while, at the same time, leaving the balance of the spectral power distribution of the lamp-fixture combination essentially unchanged.

Accordingly, it is the primary object of this invention to provide a method of "negative filtering" and means for subjecting the spectral output of fluorescent and similar lighting fixtures to reflectors having a surface configuration which will modify in a predetermined manner the reflected energy and attenuate the unwanted radiation.

It is a particular feature of the invention that the selective attenuation of unwanted emission lines of radiant energy has little or no effect on the spectral quality of the total radiation.

A particular advantage of the invention resides in the simplicity and economy of the construction of the reflectors for controlling and shaping the spectral output of a light source.

Other objects, features and advantages will be apparent from the following description of the invention, pointed out in particularity in the appended claims, and taken in connection with the accompanying drawings, in which:

FIG. 1 is a cross-sectional schematic view of a reflector arrangement, constructed in accordance with this invention, surrounding a fluorescent lamp and consisting of a prime reflector and a secondary reflector, P and S.

FIG. 2 is a partial top view of the secondary reflector.

Referring to FIG. 1, it is seen that a dome-shaped reflector is placed above the fluorescent lamp and a smaller reflector of similar configuration is placed under the lamp. Essentially, the reflectors consist of a base or substrate "A" which serves both as a non-diffusing specular reflector and a support for several superimposed layers in the form of coatings, marked "B," "C," "D," and "E." These are uniformly applied over the surface of the prime reflector.

The secondary reflector is divided into two halves in the longitudinal direction—one being provided with superimposed layers "A," "B," "C$_1$," "D," and "E," and the other half with layers "A," "B," "C$_2$," "D," and "E." The purpose and function of these layers will be explained later. Suffice it to say that all layers are of predetermined thicknesses and may be deposited on the base or substrate by means of various techniques, preferably by vacuum deposition.

Figure 3:
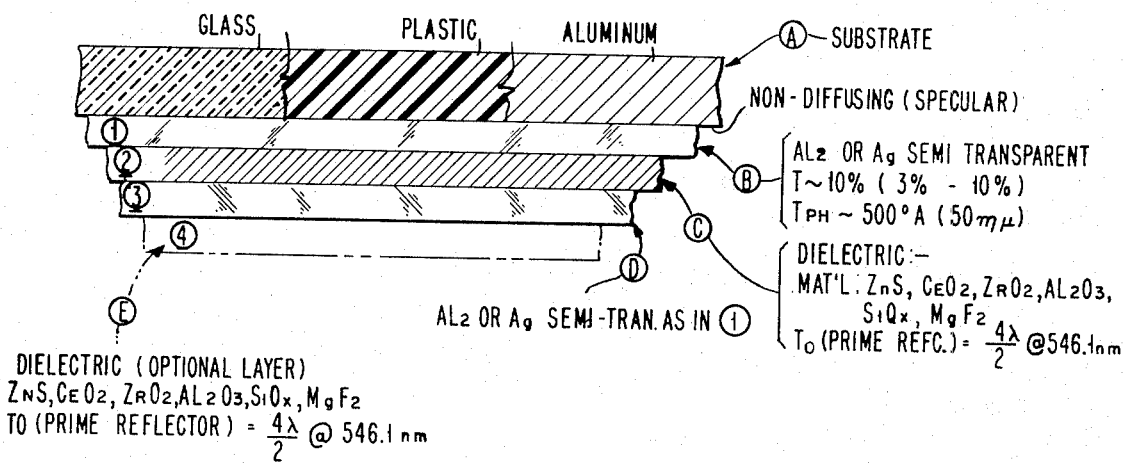
FIG. 3 is a greatly enlarged sectional view of the prime reflector surface configuration.

In FIG. 3, the sectional view indicated contains a ready reference to the various components of which the layers may consist in order to achieve the desired result. In the legend appearing in this figure and in FIG. 4, "T" refers to transmittance; "T$_{ph}$" refers to physical thickness; and "T$_o$" refers to optical thickness.

The base A, or substrate, may be glass, plastic, or aluminum and forms the physical support of the various coatings or layers which, in combination, present a surface of such optical thickness as to form a resonant cavity at a desired wavelength, namely, that of certain characteristic emission lines of the plasma, generally mercury, required to excite the valence electrons of the phosphor in the coating of the fluorescent lamp to the energy level necessary for luminous output.

Figure 4:
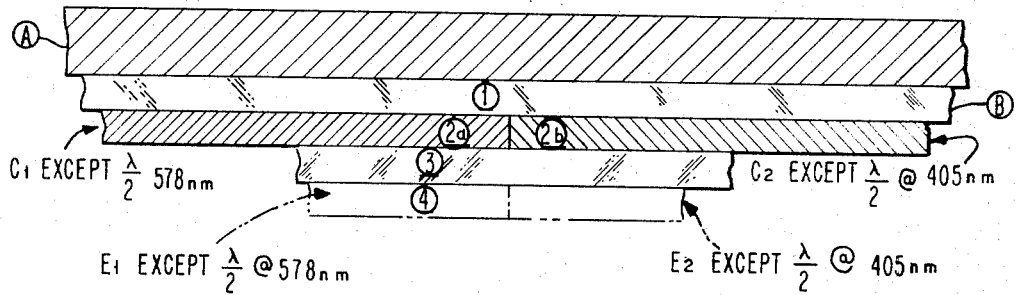
FIG. 4 is a similar view of the secondary reflector.

Continuing with the description of FIGS. 3 and 4, it is seen that the first coating, or layer B, placed on the non-diffusing specular substrate consists of a semi-transparent layer of aluminum or silver having a physical thickness of approximately 50 millimicrons. This permits adequate transparency. Over this coating is placed a dielectric layer C, the materials of which may be various metallic salts, for example, zinc sulfide, cerium dioxide, zirconium oxide, aluminum oxide, silicon monoxide, or magnesium fluoride. The optical thickness of this layer is chosen in accordance with the particular emission lines to be attenuated.

The third layer, D, is similar to that of the first layer. It will be seen that layers B and D, with the dielectric layer C therebetween, form the optical cavity which is intended to be resonant at or near the wavelength where attenuation is desired. The fourth layer, E, is an optional layer of dielectric material similar to that of C and forms a protective coating.

The smaller, secondary reflector, shown in the sectional view of FIG. 4 has semi-transparent layers similar to that of the prime reflector. The substrate, or base A, is identical with that of the primary reflector and may be of glass, plastic or aluminum, the choice being governed by design or manufacturing requirements. The first cavity forming layer B, consists, as in the prime reflector, of aluminum or silver of a physical thickness of approximately 50 millimicrons, permitting an overall light transmittance of from 3 to 10 percent. The dielectric layer is shown divided into two distinct zones, $C_1$ and $C_2$, running longitudinally in parallel relationship. The material in each zone consists of a metallic salt of the group indicated in connection with layer C of the prime reflector. The distinction between these layers is their optical thickness. Layer $C_1$ is calculated to have an optical thickness of $\lambda/2=578$ nm., i.e., 289 nm.; whereas the other half, $C_2$, is calculated to have an optical thickness of $\lambda/2=405$ nm., i.e., 202.5 nm. The choice of these optical thicknesses is governed, as will be recognized, by the location of the emission lines shown in FIG. 5, namely, those having a wavelength of 405 and 578 nanometers, respectively. These are outside of the response range of the resonant cavity of the primary reflector. The configuration of the parallel layers of the secondary reflector was found to give good results. Other mosaic structures may be chosen within the ambit of the invention.

The choice of the various optical thicknesses to produce desired resonant cavities is based on the interference filter principle. The reflectors, in fact, are spectrally selective "filters," producing negative or reduced reflection zones at desired wavelengths. The location and band widths of these negative zones are a function of the optical thickness of the entire filter $(t)$, the order of interference $(m)$, and the angle of incidence $(\phi)$. This relationship is shown in the following equation.

$$2t \cos \phi = m\lambda \qquad \text{(Equation 1)}$$

where:

$t$ = total optical thickness of the filter, including the spacer layer plus the phase considerations of the various reflecting interfaces.
$\phi$ = angle of incidence of incident radiation.
$m$ = order of interference.
$\lambda$ = wavelength or frequency of the pass bands.

For the purposes of illustration, we will only concern ourselves with radiation impinging on the reflector surface at normal incidence ($\cos \phi = 1$) which reduces Equation 1 to $$2t = m\lambda \qquad \text{(Equation 2)}$$

Figure 5:
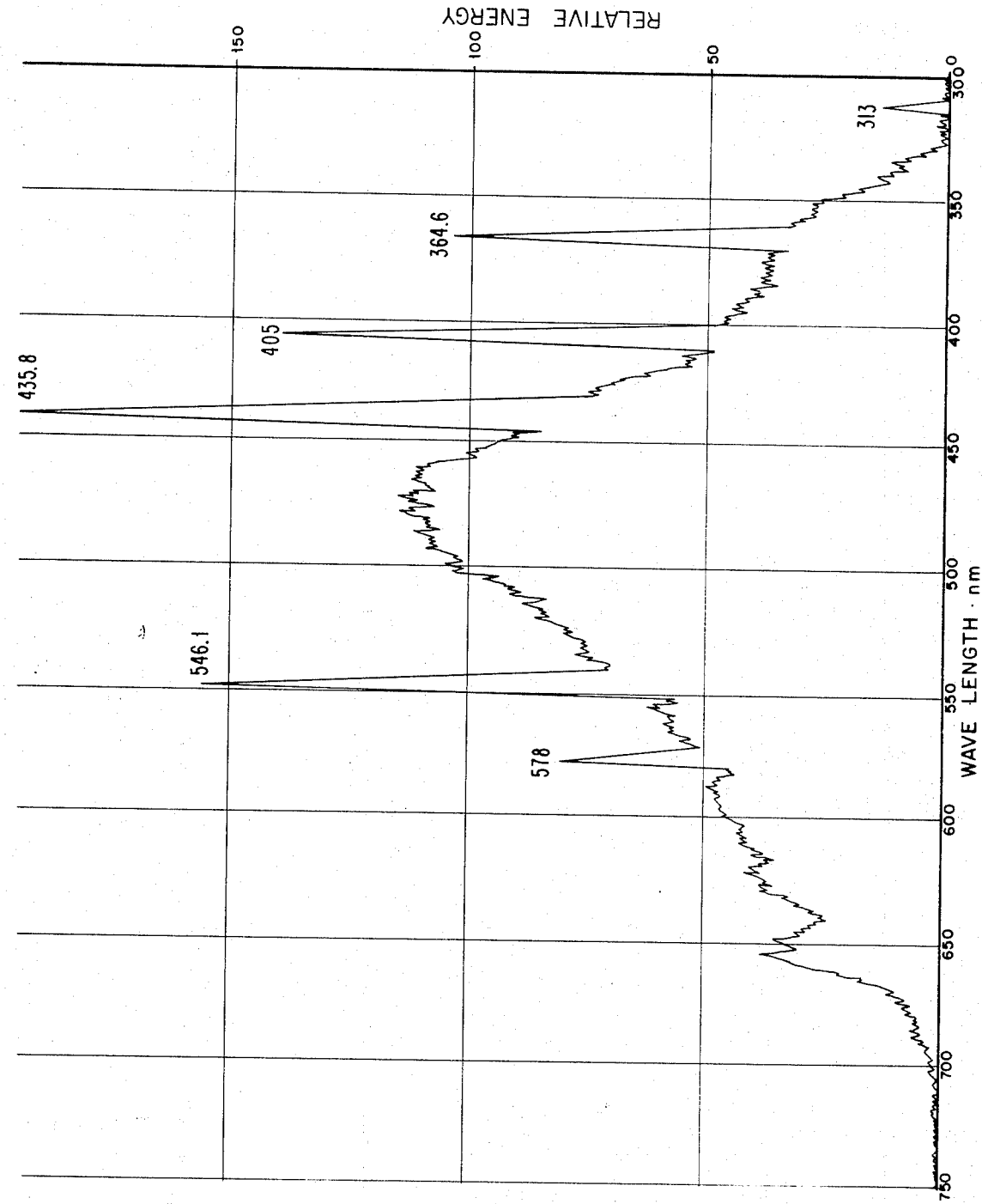
FIG. 5 is a graph showing the spectral distribution of a fluorescent light with the abscissa scaled to wavelength in nanometers and the ordinate in arbitrary units of magnitude.

Analysis of Equation 2 will show that if the cavity has an optical thickness $(t)$ of 1,092 nm., and is designed to have a fourth order pass band at 546 nm., the submultiples, namely, the fifth through seventh orders will occur at 436 nm., 364 nm., and 312 nm., all of which are within one nanometer of the wavelength of many of the intense Hg emission lines that are to be operated upon (FIG. 5).

It is not imperative that the pass bands of the resonant cavities occur at precisely the frequency of the emission lines, since proper design of the reflector will produce a pass band at each of the negative zones of sufficient half-width to include the frequency or wavelength characteristic of a particular emission line.

The filter operates on the following principle. A polychromatic wave front is incident on the outer, semi-transparent metallic layer of the filter stack. A portion of this energy is, for all practical purposes, uniformly reflected. However, neglecting dispersion, the non-reflected energy enters the spacer layer, or optical cavity, and is incident on the inner or second semi-transmitting layer. Again, a portion of this energy, still essentially polychromatic, is reflected back into the optical cavity. However, subsequent wave fronts combine with this reflected energy and due to the frequency dependent nature of the optical cavity only those frequencies at which the cavity is an integral number of half-wavelengths does reinforcement take place, resulting in relatively high transmission or, conversely, attentuated reflectance zones coincident with the frequency of the emission lines of interest.

Thus, by reflection, the filter produces narrow zones of low reflection wihch in turn attenuate or reduce the energy at the various emission line frequencies to essentially that of the phosphor continuum.

In this manner, considering FIG. 5, it is seen that four of the emission lines of the primary source, namely at 313, 364.6, 435,8 and 546.1 nanometers fall within the response range of a single resonant cavity. Thus these emission lines will be attenuated to such an extent as to be reflected substantially at the same energy level as that of the phosphor continuum.

The emission lines (spikes) at 405 and 578 nanometers do not fall within the response of the prime reflector. Hence, there are two areas to be covered, namely, the direct radiation from the lamp and the above disturbing emission lines. This is the purpose of the secondary reflector. It prevents primary radiation from impinging directly on the receptor area and provides first order resonant cavities to attenuate the excessive peaks at 405 and 578 nanometers.

By the construction or placement of the reflectors described above the spectral output of a fluorescent lamp can be modified to remove the effects of the characteristic intense Hg emission lines within the 300 to 700 nanometer spectral window. Since, in a sense, these reflectors operate as filters, although little or no absorption of energy takes place by transmission to the receptor, the method herein described may aptly be termed "negative filtering."

In a practical embodiment, the following procedure was used to obtain the coatings forming the desired optical cavities.

The substrates, whether glass, aluminum, or plastic, were thoroughly cleaned prior to mounting in their respective coating fixtures.

The following cleaning process was utilized:

(1) Rinse in running tap water at a temperature of 50° C. to 75° C. for at least two minutes.

(2) Ultrasonically cleaned in a non-etching detergent solution, such as Alconox, at a temperature of 50° C. to 75° C. for at least two minutes.

(3) Rinse in running tap water at a temperature of 50° C. to 75° C. for at least two minutes.

(4) Rinse in an ultrasonically agitated, distilled water bath at a temperature of 50° C. to 75° C. for at least two minutes.

(5) Forced air drying. The air at a temperature of 50° C. to 75° C.

The fixtures holding the substrates are then mounted in the work holder of a vacuum evaporator. To improve the uniformity of the coating, the work holder was of the rotating, planetary type. While various types of commercial vacuum coating units could be employed, all coatings were done in a Balzer BA-510 evaporator incorporating a 1,500 litre per second, oil diffusion pump backed by a gas-ballasted, 25 c.f.m. mechanical pump.

The coating chamber is evacuated to a pressure of $1 \times 10^{-3}$ torr to $1.50 \times 10^{-3}$ torr, at which time the substrate heating and glow discharge cleaning are initiated. During this time the rotating, planetary holder is revolving at a constant rate of 7½ r.p.m. This rate is not important for, an actual practice, any rate would suffice. The glow discharge is maintained at approximately 7 kv. at 50 ma.– 70 ma. for 5 to 10 minutes. Again, this power and time are not critical. The substrate heating is maintained until the substrates reach a temperature of at least 100° C. When coating plastic substrates the temperature was, for obvious reasons, kept below 75° C. to prevent deformation.

At the completion of the glow discharge portion of the cycle the servo valve which maintained the relatively high pressure necessary for sustaining the glow was closed and the pressure in the chamber reduced to $1 \times 10^{-5}$ torr or less.

When the substrates reached the desired temperature, the cage, or work holder, rotation was increased to approximately 22.7 r.p.m. At this point, sequential deposition of the various layers commenced.

By way of example, the materials cited are those which were found to produce the optimum results in attenuating the energy of the mercury emission lines to a level essentially equal to that of the phosphor continuum.

The material for the first layer, aluminum, is brought up to evaporation temperature in a resistance heated, molybdenum crucible. The substrates are shuttered from the vapor stream until a constant rate is established. This rate, which should be at least 10 nanometers per second, is monitored by maintaining the residual gas pressure during deposition between $6 \times 10^{-5}$ torr and $8 \times 10^{-5}$ torr. The shutter is now opened and deposition of the aluminum begins. Control of the thickness of the aluminum layer is accomplished by means of a modulated beam photometer operating in the transmission mode. The deposition of the aluminum continues until the monitor indicates a transmission of from 3% to 10%, at which time the shutter is closed and crucible heating is stopped.

Pre-deposition preparation for the dielectric, zinc sulphide layer now follows. For monitoring purposes a 480 nanometer, second order interference filter is inserted into a transmission beam of the modulated photometer. The use of this particular filter is dictated by the physical geometry of the coater itself and, obviously, would be some other value in another type of equipment.

Evaporation of the zinc sulphide was accomplished by means of a 3 k.v.a. electron beam gun. The material is brought up to temperature slowly (3 to 5 minutes) to prevent crepitation. During the power buildup the substrates and monitor are shielded from the source. The power to the electron beam gun was increased until dissipation was approximately 48 watts (1.2 kv. at 40 ma.). The source shutter remained closed until the chamber pressure has stabilized out at approximately $3 \times 10^{-5}$ torr. The shutter is now opened and deposition continues until the optical monitor indicates that the third maximum is achieved. At this point the combination of coater geometry, deposition rate and rotational velocity of the work holder produces a dielectric layer whose optical thickness is $2\lambda$ at 546.1 nanometers.

The third, or metallic aluminum, layer is now deposited in the same manner as for the first layer except that the 480 nanometer filter remains in the transmission beam of the modulated beam photometer.

The substrates are allowed to cool down to a reasonable temperature (50° C.) before venting and removing them from the coating chamber.

The procedure outlined above is that followed when fabricating the prime reflector. The coating of the secondary reflector would be, for all practical purposes, the same except different monitor frequencies are used so as to produce the attenuation zones at the proper wavelengths.

This invention in its broader aspects is not limited to the specific embodiment herein shown and described but departure may be made therefrom within the scope of the accompanying claims, without departing from the principles of the invention and without sacrificing its chief advantages.

What is claimed is:

1. In combination with a light source of the gaseous discharge type emitting a band of spectral energy of secondary radiation, said band containing at discrete intervals in the radiation continuum narrow bands of excessive radiation peaks characteristic of the primary radiation source, the improvement of reducing said radiation peaks to the normal level of the continuum which comprises: a primary reflector associated with said light source presenting a reflecting surface having an optical cavity resonant to a submultiple of the wavelength of certain of said radiation peaks and a secondary reflector associated with said light source presenting reflecting surfaces having optical cavities resonant to the fundamental wavelength of certain of said radiation peaks.

2. The combination in accordance with claim 1 wherein said light source is a mercury vapor fluorescent lamp, said primary reflector having a first order optical cavity of 2,184.4 nanometers and said secondary reflector having first order optical cavities at 405 and 578 nanometers, respectively.

3. In combination with a fluorescent lamp of the mercury vapor type, a primary longitudinal reflector located above said lamp comprising a solid base, a first semi-transparent layer of metallic substance deposited over said base, a second transparent dielectric layer consisting of metallic salts deposited over said first layer and a third semi-transparent metallic layer deposited over said second layer, said combined layers having an optical thickness in the range of 1,092.2 nanometers; a secondary longitudinal reflector located below said lamp comprising a solid base, two distinct adjacent semi-transparent strips of metallic substance deposited on said base, a dielectric transparent layer of metallic salts deposited over each of said adjacent strips and a semi-transparent layer of metallic substance deposited over each of said last-mentioned layers, the combined layers of one of said strips having an optical thickness in the range of 202.5 nanometers and the combined layers of the other of said strips having an optical thickness in the range of 289 nanometers.

4. The method of attenuating in a band of reflected radiant energy the excessive peaks of certain spectral components, each having a distinct wavelength which comprises alternately depositing a layer of a metallic substance and a metallic salt over a substrate, thereby forming resonant optical cavities, and subjecting said radiant energy to multiple reflections within said cavities for the attenuation of said peaks.

5. The method in accordance with claim 4 wherein the deposition of said layers forms optical cavities resonant to a sub-multiple of certain of said wavelengths.

References Cited

UNITED STATES PATENTS

| | | | |
|---|---|---|---|
| 3,288,989 | 11/1966 | Cooper | 240—47 X |
| 3,099,403 | 7/1963 | Strawick | 240—47 |
| 2,660,925 | 12/1953 | Turner | 240—47 U X |
| 2,852,980 | 9/1958 | Schroder | 240—47 U X |
| 2,552,185 | 5/1951 | Koch | 240—47 X |

SAMUEL S. MATTHEWS, Primary Examiner

M. H. HAYES, Assistant Examiner

U.S. Cl. X.R.

240—51.11 R